(12) United States Patent
Tian

(10) Patent No.: US 7,486,887 B2
(45) Date of Patent: Feb. 3, 2009

(54) PROTECTIVE DEVICE FOR CAMERA VIEW FINDER

(76) Inventor: Yongzhong Tian, 4-4, Lane 1, NanJiao Road, ZhouCun District, ZiBo City, ShanDong Province (CN)

( * ) Notice: Subject to any disclaimer, the term of this patent is extended or adjusted under 35 U.S.C. 154(b) by 374 days.

(21) Appl. No.: 11/216,419

(22) Filed: Sep. 1, 2005

(65) Prior Publication Data

US 2006/0088316 A1    Apr. 27, 2006

(30) Foreign Application Priority Data

Oct. 27, 2004    (CN)    .............. 2004 2 0094371 U

(51) Int. Cl.
G03B 11/00    (2006.01)

(52) U.S. Cl. .................. 396/544; 396/534; 348/373; 359/601; 359/612

(58) Field of Classification Search .......... 396/544, 396/534, 535; 348/333.01, 333.06, 373, 348/375, 834, 842; 359/601, 612
See application file for complete search history.

(56) References Cited

U.S. PATENT DOCUMENTS

| | | | |
|---|---|---|---|
| 3,836,985 A * | 9/1974 | Lange | 396/448 |
| 6,419,367 B1 * | 7/2002 | Dion et al. | 359/612 |
| 6,453,125 B2 * | 9/2002 | Shono | 396/287 |
| 7,002,792 B2 * | 2/2006 | Han et al. | 361/681 |
| 7,034,877 B2 * | 4/2006 | Schmidt | 348/333.01 |
| 7,083,291 B1 * | 8/2006 | Yong et al. | 359/612 |
| 7,196,742 B2 * | 3/2007 | Skjellerup et al. | 348/834 |
| 7,198,417 B2 * | 4/2007 | Zhang | 396/448 |
| 7,303,077 B2 * | 12/2007 | Harlocker | 206/576 |

FOREIGN PATENT DOCUMENTS

DE    202005004068 U1 *    7/2005

OTHER PUBLICATIONS

Doudna, Duke, "Delkin Devices(R) Introduces Pop-Up Shade Line to Protect Expensive Digital Camera LCD Screens and Take Better Pictures!", Jul. 18, 2005, Business Wire, Press Release.*
Lepage, Rick, "A bright idea for photographers", Dec. 2002, Macworld, vol. 19, Issue 12, p. 26.*
Delkin Devices Inc., "eFilm Pop-Up Shades", Jul. 18, 2005, Product Website.*

* cited by examiner

*Primary Examiner*—Christopher E Mahoney
*Assistant Examiner*—Linda B Smith
(74) *Attorney, Agent, or Firm*—Cook Alex Ltd.

(57) ABSTRACT

A protective device to protect a camera view finder and one kind of LCD protective device, which consists of a frame and a light screen installed on a frame. The frame is a separate structure. A transparent plate is installed in the middle part of the frame and a rotatable light screen is set on the frame, which can be folded through rotation. A rotatable cover plate on the other side of the frame can cover the folded light screen. An adhesive substance on the surface connects the frame to the camera body. This structure improves the view finder from strong light scattering while the camera is in use, and at the same time, provides protection for the view finder.

8 Claims, 3 Drawing Sheets

PROTECTIVE DEVICE FOR CAMERA VIEW FINDER

CROSS-REFERENCE TO RELATED APPLICATION

The present application claims priority under 35 U.S.C. §119 to patent application Ser. No. 200420094371.2 filed in the Peoples Republic of China on Oct. 27, 2004.

TECHNICAL FIELD

This utility model belongs to the assistant devices field of camera, especially is acceptable for a kind of protective device to protect the camera view finder.

BACKGROUND OF THE INVENTION

Camera has become the necessary equipment in people's life today, which adds a good many happy moment in life and records colorful life. With the popularization of camera, the assistant devices to provide carious additional functions for it also become more and more. View finder is the most part of camera, but most of what people commonly maintain and take care while in use is lens, and few people provide view finder with protection. Therefore, after using for a period of time, the view finder will be covered with dust, or more seriously, some of them may often suffer scuffing. The abovementioned phenomenons are common in former 120 cameras. For most of waist level finders, if there is not corresponding protective device, the view finder will be absolutely suffered with dust deposition and damage, and the accumulated dust is not easy to clean up, even more, the image on the view finder screen will not be seen clearly due to the interference of strong light and the view effect will be seriously affected. For the LCD view finder of digital camera in gradual popularization in recent years, because it is exposed outside directly, the abovementioned phenomenons of dust deposition and scuffing are more serious comparing with old-style 120 camera. At the same time, due to the specificity of LCD view finder, the observing effect is not good during side view, which is more serious under the condition of stronger sunlight.

SUMMARY OF THE INVENTION

The purpose of this utility model is to provide a protective device with dustproof and camera view finder protective functions to settle the abovementioned shortcomings. At the same time, this device also resolves the dust deposition and scuffing problems of LCD view finder of digital camera nowadays, which as well has a perfect effect to keep out the strong light and can be installed on the camera simply and conveniently.

The utility model realizes its functions through following technical proposals: One kind of LCD protective device is composed of frame and light screen installed on frame. The said frame adopts separate structure. There is a transparent plate installed in the middle part of frame and also a rotatable light screen set on the frame, which can be folded through the rotation. There is a rotatable cover plate on the other side of frame, which can cover the folded light screen. There is adhesive substance on the surface connecting the frame and camera body.

The said separate structure means that the frame is divided into at least two parts. There is a hooked protuberance on one part used to clamp the other part, and there is a notch matching to the abovementioned hooked protuberance on the corresponding position of the other part. The said notch is a gap whose one end is larger and the other end is smaller. The larger end is corresponding to the largest section of the hooked protuberance and the smaller one is matching to the smaller section of the hooked protuberance. The section of the said hooked protuberance connecting the frame is smaller and the other end section is larger. The said separate structure adopts to set magnet on one part of the frame composed of two parts, magnet or sheet iron on the other part.

The said adhesive substance is a belt with stickiness on both sides and is set along the outer fringe form of the transparent plate.

This utility model realizes following active technical effect through the abovementioned technical resolution: firstly, adopting the structure setting adhesive substance along the edge of the protective device, the protective device can be conveniently installed on the camera without help of any camera components, which can not damage the camera body effect and can make the camera view finder sealed well to prevent dust to enter. It can not affect the observation effect after the camera view finder sealed by adopting the structure to set transparent plate on protective device. It allows the protective device to be with perfect shading effect by adopting the structure to install light screen and cover plate on the protective device. With the structure of separate frame, the transparent plate of protective device can be protected, and at the same time, the shading part can be conveniently taken down under the condition without shading and it can realize various operations in different conditions.

DESCRIPTION OF THE PREFERRED EMBODIMENTS

Figure 1:
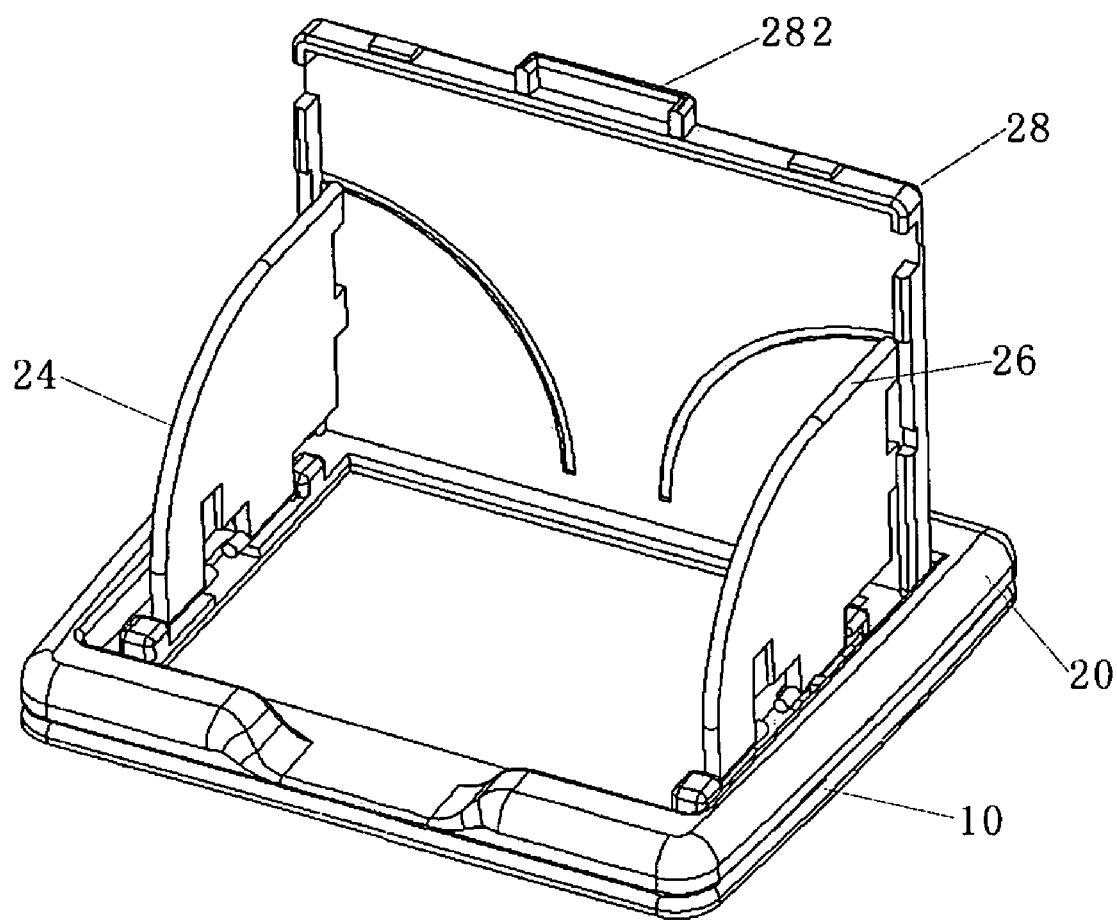
FIG. 1 is the stereoscopic schematic drawing of this utility model.
Figure 2:
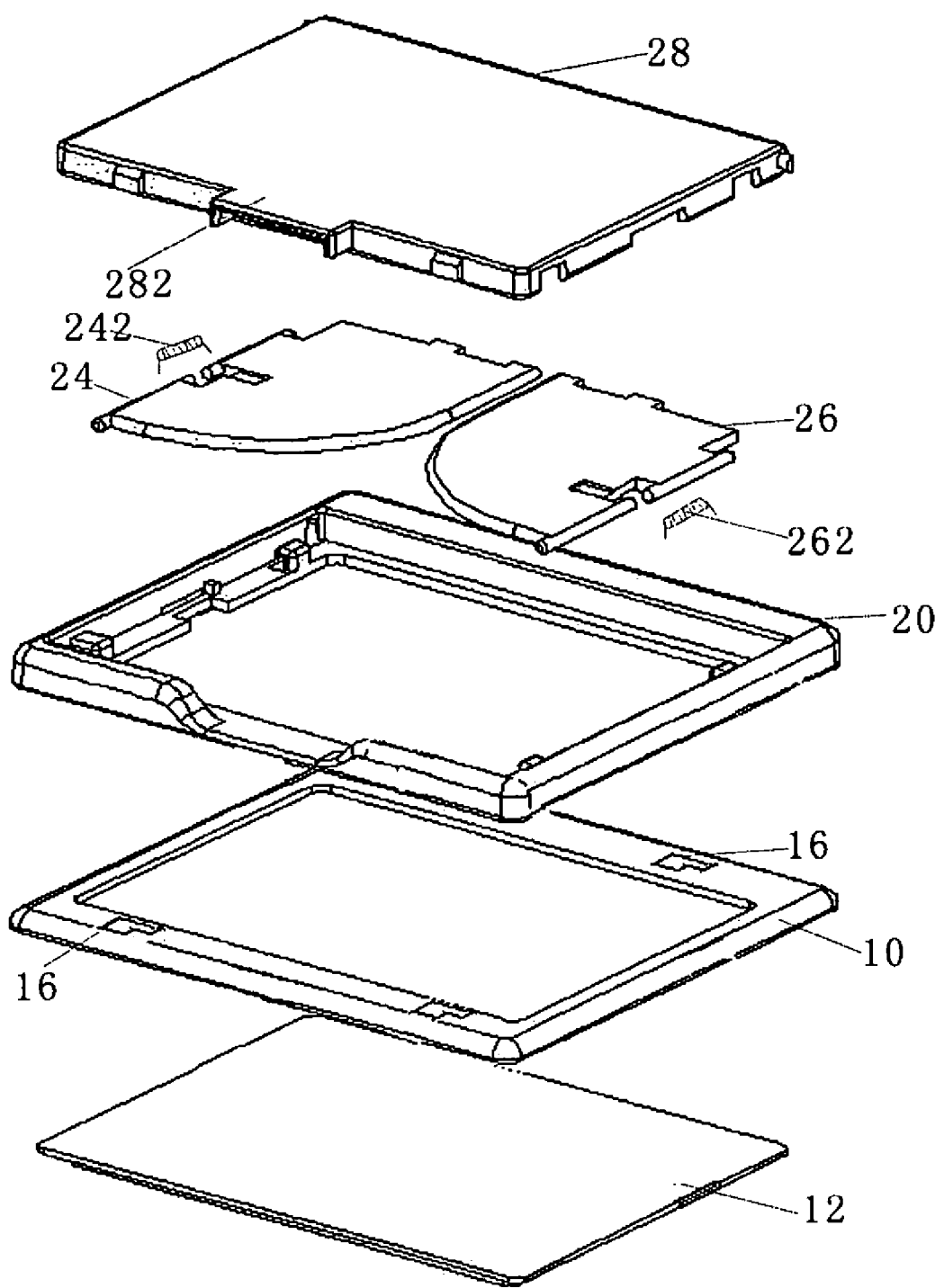
FIG. 2 is the exploded schematic drawing of this utility model.
Figure 3:
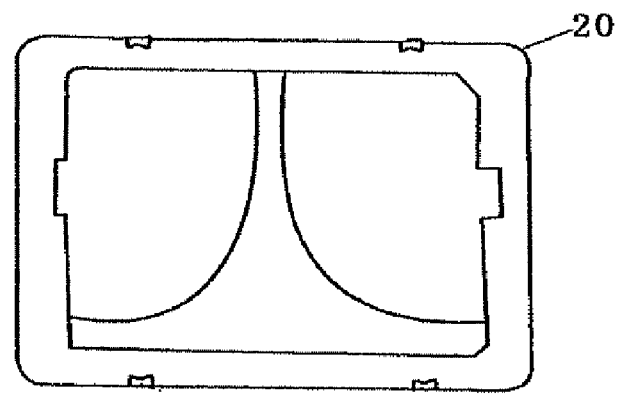
FIG. 3 is the schematic drawing of the frame's separate structure of this utility model.
Figure 4:
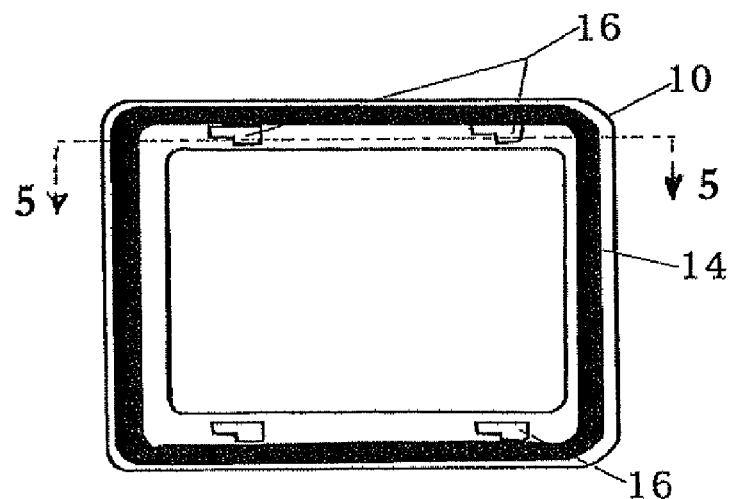
FIG. 4 is the vertical view of the frame's separate structure of this utility model.
Figure 5:
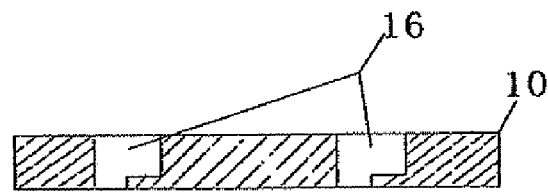
FIG. 5 is the cutaway view of the frame's separate structure of this utility model taken along section line 5-5 in FIG. 4.

As shown in FIG. 1 and FIG. 2, there are two light screens 24 and 26 in the said view finder protective device which are correspondingly installed in the cupped parts of the frame 20. Two light screens 24 and 26 are parallel to each other, correspondingly installed on the frame 20 and connect with frame 20 through hinge. Furthermore, there are springs 242 and 262 (FIG. 2) at the hinge connection position of light screens 24 and 26. The cover place 28 is installed on the other side of the frame 20, whose installing side is installed vertically to the connection direction of the abovementioned light screens 24 and 26 and whose size is right to cover the abovementioned light screens 24 and 26. To ensure the abovementioned light screens 24 and 26 to rotate more stably, there is a circular arc-type notch set on the abovementioned cover plate 28 to guide the light screens 24 and 26 to rotate stably. There is a protuberant part of cover plate clamp 282 set on the other side of cover plate 28. After the cover plate 28 covers the light screens 24 and 26, the cover plate clamp 282 enters into the notch on the corresponding position of frame 20 to make the abovementioned cover plate 28 keep fasten down. The abovementioned frame 20 is the upper part of the separate-structure protective device where all the abovementioned components are set. The frame 10 as shown in FIGS. 4 and 5 is the lower part of the separate-structure protective device. There is clamping component installed on the joint face between the above-mentioned frames 10 and 20. There is a hooked protuberance on frame 20 used for clamping the other part, whose one end section connecting with frame is smaller and the other end section is larger. There is a notch 16 on the frame 10, which is a gap whose one end is larger and the other end is smaller. The size of the larger end is matching with the largest section of hooked protuberance and the size of the smaller end is corresponding with the smaller section of the hooked protuberance. Four abovementioned matching hooked protuberances and notches 16 are usually used during operation. During operation, the hooked protuberance is inserted through the wider part of notch 16, and then is shifted to enter into the smaller part of notch 16 to finish the connection of the separate-structure frame. There is a transparent plate 12 on frame 10 whose size is rightly matching with the corresponding in-use camera view finder. There is adhesive substance 14 set on the bottom part of frame 10 which adopts usual double sided tape and of course it is OK to adopt other sticky tapes. While in use, firstly take the abovementioned view finder protective device to perfectly align the camera view finder and stick to fix it on the camera. In the condition where needs shading, it is Ok to connect the upper part of protective device with the camera, otherwise, it is right to just take off the abovementioned part. The remaining parts will not affect the observation and view effect through transparent plate 12, and at the same time, it also can have a dust proof and view finder protective effect.

There is also another operating method for this utility model, of which, the main structure is generally same with the abovementioned structure except the different connection type of the separate-structure frame. What is adopted to use magnet attraction to finish the abovementioned connection. The specific structure adopts to set magnet on one of part of the abovementioned separate-structure frame, and magnet, sheet iron or other sheet metal which can be attracted by magnet on the other part. It can realize the installation and separation of the abovementioned frame's separate structure more conveniently through the abovementioned method.

The invention claimed is:

1. A protective device for a view finder of a camera, said protective device comprising:
 a frame consisting of at least two parts;
 a transparent plate installed in a middle part of the frame;
 a rotatable light screen set on one side of the frame which can be rotated between a folded position and an open position;
 a rotatable cover plate set on another side of the frame which can cover the light screen when the cover plate is in the folded position; and
 an adhesive substance disposed on a bottom surface of the frame to adhere the protective device to the camera.

2. The protective device for a view finder of a camera according to claim 1 wherein the separate structure of the frame comprises:
 a first part with a hooked protuberance, and
 a second part with a notch therein sized to match the hooked protuberance of the first part, and the notch located in a corresponding position on the second part to the location of the protuberance on the first part such that the hooked protuberance clamps the first part to the second part.

3. The protective device for a view finder of a camera according to claim 2 wherein the notch in the second part comprises:
 a gap consisting of a first end and a second end, the first end of larger dimension than the second end; and
 the larger first end corresponding in dimension to a larger section of the hooked protuberance and the smaller second end corresponding in dimension to a smaller section of the hooked protuberance.

4. The protective device for a view finder of a camera according to claim 3 wherein the smaller section of the hooked protuberance connects to the frame.

5. The protective device for a view finder of a camera according to claim 1 wherein the frame consists of two parts, a first part with a magnet disposed thereon, and a second part consisting of sheet iron or having another magnet disposed thereon.

6. The protective device for a view finder of a camera according to claim 1 further comprising:
 an adhesive substance disposed on a bottom surface of the protective device to adhere the protective device to the camera.

7. The protective device for a view finder of a camera according to claim 6 wherein the adhesive substance is double sided adhesive tape.

8. The protective device for a view finder of a camera according to claim 6 wherein the adhesive substance is disposed about a perimeter of the transparent plate.

* * * * *